United States Patent
Gschwind et al.

(10) Patent No.: US 7,877,582 B2
(45) Date of Patent: Jan. 25, 2011

(54) MULTI-ADDRESSABLE REGISTER FILE

(75) Inventors: Michael K. Gschwind, Chappaqua, NY (US); Brett Olsson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/023,720

(22) Filed: Jan. 31, 2008

(65) Prior Publication Data

US 2009/0198966 A1 Aug. 6, 2009

(51) Int. Cl.
G06F 9/30 (2006.01)
G06F 15/76 (2006.01)

(52) U.S. Cl. .......................................... 712/226; 712/3

(58) Field of Classification Search ................ 712/3, 712/226

See application file for complete search history.

(56) References Cited

U.S. PATENT DOCUMENTS

| | | | |
|---|---|---|---|
| 4,595,911 A | 6/1986 | Kregness et al. | |
| 5,063,497 A | 11/1991 | Cutler et al. | |
| 5,278,945 A | 1/1994 | Basehore et al. | |
| 5,341,320 A | 8/1994 | Trissel et al. | |
| 5,390,307 A | 2/1995 | Yoshida | |
| 5,450,607 A | 9/1995 | Kowalczyk et al. | |
| 5,487,022 A | 1/1996 | Simpson et al. | |
| 5,560,035 A | 9/1996 | Garg et al. | |
| 5,668,984 A | 9/1997 | Taborn et al. | |
| 5,669,013 A * | 9/1997 | Watanabe et al. ............... | 710/5 |
| 5,675,777 A | 10/1997 | Glickman | |
| 5,685,009 A * | 11/1997 | Blomgren et al. .............. | 712/23 |
| 5,701,508 A | 12/1997 | Glew et al. | |
| 5,751,987 A | 5/1998 | Mahant-Shetti et al. | |
| 5,761,103 A | 6/1998 | Oakland et al. | |
| 5,768,169 A | 6/1998 | Sharangpani | |
| 5,805,475 A | 9/1998 | Putrino et al. | |
| 5,822,778 A | 10/1998 | Dutton et al. | |
| 5,825,678 A | 10/1998 | Smith | |
| 5,978,901 A | 11/1999 | Luedtke et al. | |
| 5,995,122 A | 11/1999 | Hsieh et al. | |
| 6,009,511 A | 12/1999 | Lynch et al. | |

(Continued)

OTHER PUBLICATIONS

U.S. Appl. No. 12/023,768, filed Jan. 31, 2008, Gschwind et al.

(Continued)

*Primary Examiner*—Daniel Pan
(74) *Attorney, Agent, or Firm*—Stephen J. Walder, Jr.; Kenneth R. Corsello; William J. Stock

(57) ABSTRACT

A single register file may be addressed using both scalar and SIMD instructions. That is, subsets of registers within a multi-addressable register file according to the illustrative embodiments, are addressable with different instruction forms, e.g., scalar instructions, SIMD instructions, etc., while the entire set of registers may be addressed with yet another form of instructions, referred to herein as Vector-Scalar Extension (VSX) instructions. The operation set that may be performed on the entire set of registers using the VSX instruction form is substantially similar to that of the operation sets of the subsets of registers. Such an arrangement allows legacy instructions to access subsets of registers within the multi-addressable register file while new instructions, i.e. the VSX instructions, may access the entire range of registers within the multi-addressable register file.

19 Claims, 9 Drawing Sheets

U.S. PATENT DOCUMENTS

| | | |
|---|---|---|
| 6,105,129 A | 8/2000 | Meier et al. |
| 6,131,104 A | 10/2000 | Oberman |
| 6,178,482 B1 | 1/2001 | Sollars |
| 6,185,671 B1 | 2/2001 | Pentovski et al. |
| 6,282,554 B1 | 8/2001 | Abdallah et al. |
| 6,292,815 B1 | 9/2001 | Abdallah et al. |
| 6,295,599 B1 | 9/2001 | Hansen et al. |
| 6,321,327 B1 | 11/2001 | Makineni et al. |
| 6,460,135 B1 | 10/2002 | Suganuma |
| 6,715,061 B1 | 3/2004 | Wang |
| 6,792,523 B1 | 9/2004 | Glew et al. |
| 6,839,828 B2 | 1/2005 | Gschwind et al. |
| 6,934,830 B2 | 8/2005 | Kadambi et al. |
| 7,043,627 B2 | 5/2006 | Shimizu et al. |
| 7,149,882 B2 | 12/2006 | Glew et al. |
| 7,257,695 B2 | 8/2007 | Jiang et al. |
| 7,430,656 B2 | 9/2008 | Sperber et al. |
| 2005/0125630 A1* | 6/2005 | Liao et al. ............... 712/5 |
| 2005/0289299 A1 | 12/2005 | Nunamaker et al. |

OTHER PUBLICATIONS

U.S. Appl. No. 12/023,768, Image File Wrapper printed from PAIR on Jun. 11, 2010, 2 pages.

Notice of Allowance mailed Jul. 30, 2010 for U.S. Appl. No. 12/023,768, 7 pages.

* cited by examiner

MULTI-ADDRESSABLE REGISTER FILE

BACKGROUND

1. Field of the Invention

The present application relates generally to an improved data processing apparatus and method. More specifically, the present application is directed to an apparatus and method for providing a multi-addressable register file.

2. Background of the Invention

High-performance processors support multimedia-processing using single instruction multiple data (SIMD) techniques for exploiting instruction-level parallelism in programs. That is, SIMD techniques are used for executing more than one operation at a time. These processors contain multiple functional units, some of which are directed to the execution of scalar data and some of which are grouped for the processing of structured SIMD vector data. SIMD data streams are used to represent multimedia datatypes, such as color information, using, for example, the RGB format by encoding the red, green, and blue components in the structured data type, or coordinate information, by encoding position as the quadruple (x, y, z, w). Implementations based on the addition of a full-function SIMD processing block to an existing scalar block lead to large processor cores where multiple units are unnecessarily replicated, each replica dedicated to the processing of either scalar data or one element of the structured multimedia data type.

Processors designed for processing multimedia data have been implemented by augmenting an existing scalar processor implementation, for instance by adding a SIND unit, the SIND unit itself consisting of multiple functional units (i.e., fixed point units and floating point units) mirroring resources available for the processing of scalar data types, and replicating each functional unit type for the number of structured elements to be supported by the SIND architecture. The only units shared between the scalar and SIMD processing units are the issue logic, which issues instructions to either the scalar or SIMD processing blocks, and the load/store unit, which governs access to the memory subsystem. All other units, including the register files, are maintained separate.

SUMMARY

In one illustrative embodiment, a method, in a data processing system, for processing an instruction is provided. The method may comprise determining an instruction type for a received instruction, accessing a multi-addressable register file based on the instruction type and processing the instruction using a function unit of the data processing system based on results of accessing the multi-addressable register file. The multi-addressable register file may comprise a first subset of registers associated with first instructions of a first instruction type and a second subset of registers associated with second instructions of a second instruction type. Third instructions of a third instruction type may access registers in an entire set of registers of the multi-addressable register file including registers in the first subset of registers and registers in the second subset of registers.

In another illustrative embodiment, an apparatus is provided that comprises an instruction decode unit coupled to the instruction fetch unit, a multi-addressable register file coupled to the instruction decode unit, and one or more functional units coupled to the multi-addressable register file. With this apparatus, the decode unit may determine an instruction type for a received instruction and may access the multi-addressable register file based on the instruction type. The one or more functional units may process the instruction based on results of accessing the multi-addressable register file. The multi-addressable register file may comprises a first subset of registers associated with first instructions of a first instruction type and a second subset of registers associated with second instructions of a second instruction type. Third instructions of a third instruction type may access registers in an entire set of registers of the multi-addressable register file including registers in the first subset of registers and registers in the second subset of registers.

In yet another illustrative embodiment, a computer program product comprising a computer readable medium having a computer readable program recorded thereon is provided. The computer readable program, when executed on a computing device, may cause the computing device to determine an instruction type for a received instruction, access a multi-addressable register file based on the instruction type, and process the instruction using a function unit of the data processing system based on results of accessing the multi-addressable register file. The multi-addressable register file may comprise a first subset of registers associated with first instructions of a first instruction type and a second subset of registers associated with second instructions of a second instruction type. Third instructions of a third instruction type may access registers in an entire set of registers of the multi-addressable register file including registers in the first subset of registers and registers in the second subset of registers.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

Appendix A provides details regarding the floating point processor facility in accordance with one exemplary architecture in which the aspects of the illustrative embodiments may be implemented;

Appendix B provides details regarding the decimal floating point processor facility in accordance with one exemplary architecture in which the aspects of the illustrative embodiments may be implemented;

Appendix C provides details regarding a VMX processor facility in accordance with one exemplary architecture in which the aspects of the illustrative embodiments may be implemented; and Appendix D provides details regarding a VSX processor facility in accordance with one exemplary architecture in which the aspects of the illustrative embodiments may be implemented.

DETAILED DESCRIPTION OF THE ILLUSTRATIVE EMBODIMENTS

As discussed above, to date, processors designed for processing multimedia data have typically been implemented by augmenting an existing scalar processor implementation, for instance by adding a SIMD unit, the SIMD unit itself consisting of multiple functional units (i.e., fixed point units and floating point units) mirroring resources available for the processing of scalar data types, and replicating each functional unit type for the number of structured elements to be supported by the SIMD architecture. Often, the only units shared between the scalar and SIMD processing units are the issue logic, which issues instructions to either the scalar or SIMD processing blocks, and the load/store unit, which governs access to the memory subsystem. All other units, including the register files, are maintained separate.

Figure 1:
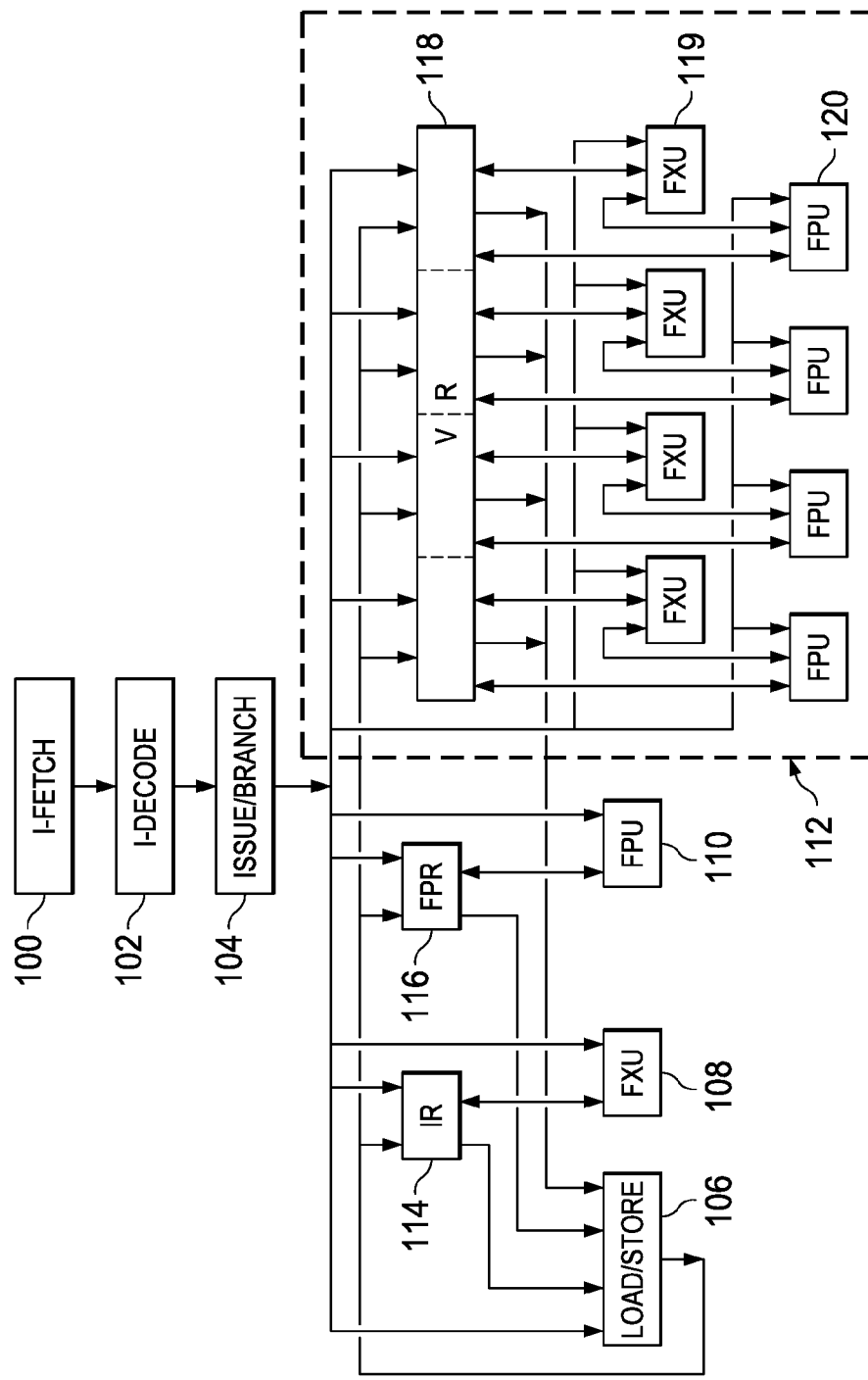
FIG. 1 is a block diagram depicting an example of a prior art processor containing both scalar processing units and a SIMD unit for processing structured data types.

FIG. 1 is a block diagram depicting an example of a prior art processor containing both scalar processing units and a SIMD unit for processing structured data types, the SIMD unit comprising multiple processing units for each element in the structured data type. This processor implementation is exemplary of prior art systems; in some implementations, some register files may be shared, e.g., a combined integer and floating point register file, or additional register files may be present, such as a condition register file or a predicate register file for comparison results. But in general, the use of separate scalar and SIMD processors is inefficient and expensive in that such a configuration includes a number of redundant functional units and data paths. Furthermore, such implementations result in an undesirable amount of power consumption since while either the scalar or SIMD unit is processing data, the other is generally sitting idly by, awaiting its next instruction, but all the while consuming system power.

During operation of the system of FIG. 1, instructions are fetched by instruction fetch unit 100, and supplied to an instruction decode unit 102. Decoded instructions are passed to an issue/branch unit 104, where branch instructions are resolved and other instructions can be stored in the instruction issue unit thereof (not shown) until they can be executed in one of the functional units of the processor. The instruction issue unit can contain prediction logic, instruction reordering logic, instruction issue buffers and other logic supporting the high-performance issuing of instructions.

Instructions are issued by the issue/branch unit 104 to one or more of the load/store unit 106, the fixed-point unit 108, the floating-point unit 110, or the SIMD processing block 112. Before instructions can be processed by one or more of the processing units, one or more register accesses are usually required in a register file, e.g., the integer register file 114, the floating point register file 116, or the vector register file 118 which is a part of the SIMD multimedia extension found in many contemporary processors.

The SIMD multimedia processing block 112 typically contains a vector register file 118 for storing structured data (usually a vector consisting of four elements). The vector register file 118 may be segmented into four sub-register files, each storing a single field of the structured data. The SIMD multimedia processor block 112 may contain several types of function units, each type being replicated for the number of elements in the structured data type supported by the multimedia extension. In FIG. 1, there are shown fixed point units 119 and floating point units 120 replicated four times to process one structure element each as can be found in the PowerPC™ VMX multimedia extension.

It can be seen that, where both scalar and SIMD instruction execution are provided, separately addressable register files are typically required for the various types of instructions that may be encountered by the CPU. For example, as shown in FIG. 1, a separate integer register file 114, floating point register file 116, and vector register file 118 are provided. Having separate registers files in this manner is expensive in terms of overhead as well as power consumption. Having multiple register files means that as code is executed, the code must switch or move between the various register files. This makes code generation expensive in terms of the overhead associated with moving between the various register files. Moreover, a compiler of the code may require more of one or another set of resources associated with the register files leading to register file fragmentation. Furthermore, having separate resources in the micro-architecture of the CPU increases the costs associated with fabrication of the CPU as well as costs associated with power consumption, heat dissipation, etc.

In U.S. Pat. No. 6,839,828, a combined scalar/vector addressable register file is described along with a processor designed to operate in a plurality of modes for processing vector and scalar instructions. A parallel vector unit, coupled to the register files, includes functional units configurable to operate in a vector operation mode and a scalar operation mode. The vector unit includes an apparatus for tightly coupling the functional units to perform an operation specified by a current instruction. Under a vector operation mode, the vector unit performs, in parallel, a single vector operation on a plurality of data elements. The operations performed on the plurality of data elements are each performed by a different functional unit of the vector unit. Under a scalar operation mode, the vector unit performs a scalar operation on a data element received from the register files in a functional unit within the vector unit.

While the mechanism of U.S. Pat. No. 6,839,828 provides the ability to store different types of instructions/data in the register file, in order to achieve this ability, the '828 patent sets forth a new architecture. The problem with defining a new architecture in this manner is that the new architecture precludes the successful compatible execution of legacy programs, i.e. pre-existing applications designed for execution by a previous architecture. Furthermore, the pre-existing legacy architectures supporting the legacy programs may contain assumptions and require specific data formats for scalar and vector data, making transparent sharing of scalar and vector data impossible in the prior art. Thus, the mechanisms of the '828 patent do not provide for multi-addressability, i.e. different ways of addressing registers in the register file based on the instruction type, e.g., legacy scalar, legacy vector, or a new instruction type.

The illustrative embodiments provide an apparatus and method for providing a multi-addressable register file. Such a multi-addressable register file may be implemented in a processor of a data processing system. Such a data processing system may have one or more processors in which each processor, or a subset of processors, may implement the multi-addressable register file of the illustrative embodiments. The types of data processing systems in which processors having a multi-addressable register file in accordance with the illustrative embodiments may vary considerably and thus, the present description cannot address each such possible processor architecture. However, for purposes of illustration, FIG. 2 is provided as an example of one type of data processing system in which the multi-addressable register file of the illustrative embodiments may be implemented.

Figure 2:
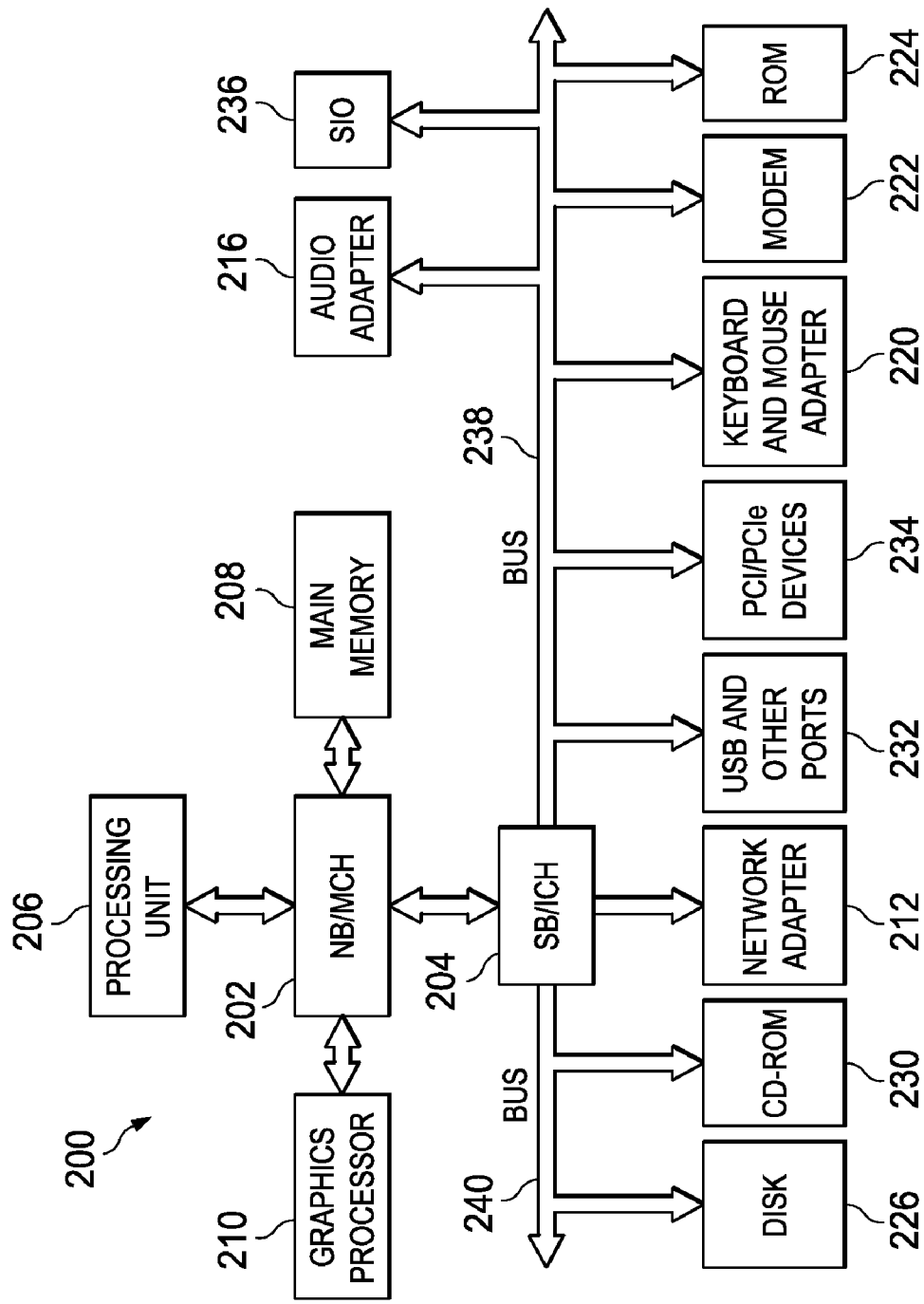
FIG. 2 is an exemplary diagram of a data processing system in which exemplary aspects of the illustrative embodiments may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both) or the Linux® operating system (LINUX is a trademark of Linus Torvalds in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p™ computer system, running the Advanced Interactive Executive (AIX®) operating system or the LINUX® operating system (eServer, System p™ and AIX are trademarks of International Business Machines Corporation in the United States, other countries, or both). Data processing system 200 may be a symmetric multiprocessor (SMP) system including a plurality of processors, such as the POWER™ processor available from International Business Machines Corporation of Armonk, N.Y., in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As discussed above, the illustrative embodiments provide an apparatus and method for providing a multi-addressable register file. The illustrative embodiments improve upon known register files by increasing the capability of the register file by providing a large number of registers and an ability to address a first subset of registers with a first set of instructions, address a second subset of registers with a second set of instructions, and to address the entire register file with at least a third set of instructions. In accordance with the illustrative embodiments, the first and second subsets of register are non-overlapping and refer to distinct register file areas, such as "registers for instructions of type 1" and "registers for instructions of type 2." A register contained within the subset corresponding to instructions of type 1 cannot be accessed by instructions of type 2, and vice versa. In one illustrative embodiment, the type 1 instructions correspond to IBM Power Architecture FPU, or legacy floating point instructions, the type 2 instructions correspond to IBM Power Architecture legacy VMX instructions, and the type 3 instructions correspond to IBM Power Architecture VSX instructions.

The mechanisms of the illustrative embodiments differ from known clustered register files, operand subranges within register files, processors with "move between register file" instructions, and VMX128 register files, which uses a form of subranges with non-contiguous register specifiers. With operand subranges, typically there is one subrange for one operand only, i.e. one type of instruction. There is no other instruction type that has another form that may address all registers in the register file and there is no other range of registers for another type of instructions, i.e. there is no multi-addressability functionality. Clustered register files comprise a large register file with sub-ranges addressable by different instructions, but there is no instruction type that may address all of the registers in the register file. To the contrary, if operations are to be performed on the full set of registers, then move/copy operations must be performed on the register file. These move/copy operations are usually slower operations that may require special scheduling mechanisms.

In contradistinction, the illustrative embodiments provide access to the registers of the multi-addressable register file based on the instruction type, e.g., legacy floating point, legacy scalar, new vector-scalar, etc. Rather than one subset of registers associated with one operand type, the multi-addressable register file of the illustrative embodiments provides multiple disjointed subsets of registers. The multiple subsets of registers, in the multi-addressable register file, associated with the various types of instructions are contiguous ranges of registers. Moreover, with the illustrative embodiments, while instructions of different types may access non-overlapping subsets of registers in the multi-addressable register file, at least one type of instruction may also access all of the registers in the multi-addressable register file.

In another aspect of the present invention the illustrative embodiments extend known scalar/vector register files by including an ability to execute scalar, vector, and floating point instructions using the same register file with the portion of the register file to be accessed being dynamically determined based on the type of instruction being executed. Since the illustrative embodiments improve upon known scalar/vector register files, and the processors that use such scalar/vector register files, it is important to first understand the basic operation of such a processor and scalar/vector register file. The following description of FIGS. 3A and 3B will make reference to commonly assigned U.S. Pat. No. 6,839,828 as exemplary of such a known scalar/vector register file and processor.

Figure 3A:
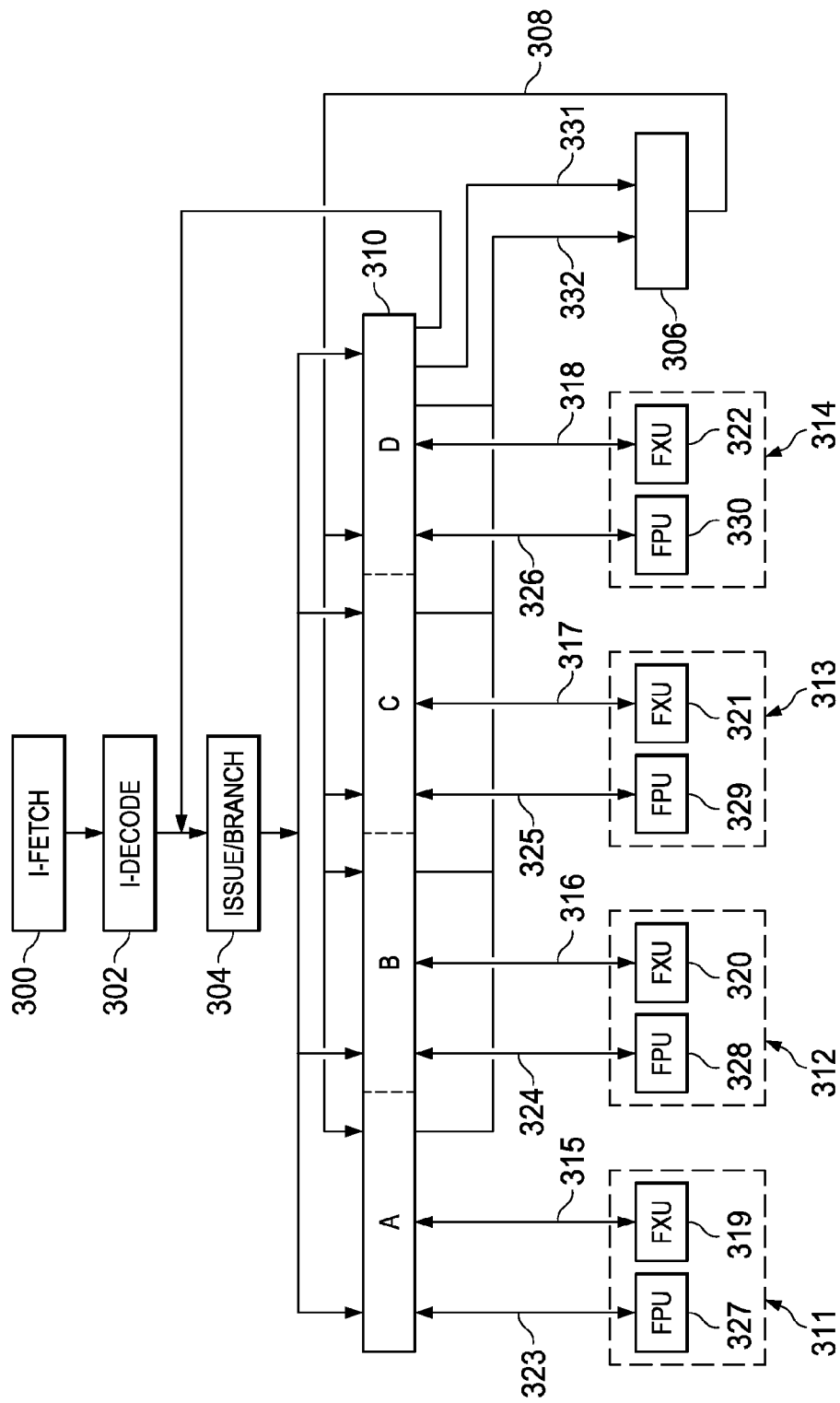
FIG. 3A is an exemplary diagram of a processor designed to execute both a scalar and vector instructions using a register file storing both scalar and vector data and address information in accordance with U.S. Pat. No. 6,839,828.

FIG. 3A is an exemplary diagram of a processor designed to execute both a scalar and vector instructions using a register file storing both scalar and vector data and address information in accordance with U.S. Pat. No. 6,839,828. In the processor shown in FIG. 3A, scalar and SIMD data path processing capabilities have been combined with the SIMD vector data path now subsuming scalar processing. Scalar processing preferably occurs in one of the units used for processing one element of a vector data type. This data unit is designated the "preferred slot" and provides addresses for the branch unit and the load/store unit, as will be described below. For simplicity, the depiction of the unified processor in FIG. 3A includes data flow connections only, and not control signal connections and external system interfaces, e.g., address lines, connections with memory, etc. The latter connections are assumed.

The unified processor of FIG. 3A includes an instruction fetch unit 300, which fetches instructions and data from the system's memory hierarchy (not shown) based upon the value of the fetch unit's program counter. Fetched instructions are provided by instruction fetch unit 300 to instruction decode unit 302, where they are decoded and expanded into appropriate control signals for controlling downstream units. The expanded instruction is passed to issue/branch unit 304, where it is placed into an instruction queue to await availability of appropriate functional units for processing. In the event that the instruction is a branch, control is returned to instruction fetch unit 300, which fetches the branch-target instruction, and the above process is repeated.

In the case of a scalar operation, when a functional unit (i.e., fixed point unit or floating point unit) becomes available or in the case of a vector operation, when multiple functional units become available, the issue/branch unit 304 issues the instruction to the one or more functional units. Before computation can be performed, source operand data is retrieved by accessing a scalar-vector register file (SVRF) 310. Multiple types of function units are typically provided, e.g., fixed point units, floating point units, and a load/store unit (LSU) 306, the latter fetching from and storing to the memory hierarchy the data identified by the current instruction. The LSU 306 stores the result of memory accesses back to the combined SVRF 310 via bus 308. In this embodiment, SVRF 310 stores data lines consisting of four scalar data words, each line being partitioned such that each of the four data words is associated with a different functional unit pair (or set) 311-314, each functional unit pair consisting of a fixed point unit and a floating point unit as shown. The functional unit pairs make up what is referred to herein as a parallel vector unit.

Issue logic directs the SVRF 310 to pass the contents of a data line to the appropriate functional unit within each set of functional units, for processing. There may be any number and type of functional units associated with an issue slot, including, but not limited to, fixed-point unit, floating-point unit, comparison unit, logical operation unit, shift unit, etc. The particular functional unit within the set that will use the data word will depend on the instruction to be executed, and is controlled by a signal from issue/branch unit 304. Thus, if the instruction requires the fixed point units to operate on the data, data will be passed to fixed point units 319-322 via lines 315-318. If the instructions require floating point units 327-330, data will be passed via lines 323-326. If other functional unit types were present, data would similarly be passed to them. When each designated functional unit has performed its operation on the input data, it passes a result back to SVRF 310, where it is stored until requested by LSU 306, or passed to the functional units for further manipulation.

The operations to be performed by the functional units, and the functional units to perform those operations, are determined by control signals provided by issue/branch unit 304. When an operation directs the LSU 306 to read data from SVRF 310, the data is passed via data bus 332. In addition, the address to which the data is to be stored in memory is passed to LSU 306 via bus 331. In the embodiment of FIG. 3A, address bus 331 passes information from a segment (D) of SVRF 310, which is associated with functional unit pair 314 (this pair being designated a preferred slot, as described later). The preferred slot could be any of the functional units, by either defining them as preferred slot, or by means of dynamically determining a preferred slot, either by setting a control register, specifying a slot in the instruction word, or by determining it using any other means, e.g., by the issue unit at issue time. The designation of a preferred slot allows for selective powering-down of functional units, resulting in power savings.

To this point, the described operation of the unified processor has applied to both scalar and vector operations. That is, if an operation to be performed is a scalar operation, thus requiring operation and output of only one functional unit pair, the remaining functional unit pairs may nevertheless be directed to perform the same operation on data passed to them from the scalar vector register file. Such an approach allows for simplicity of design, since to require different functional units to simultaneously execute different operations necessarily introduces complicating design considerations. Likewise, for a vector operation, each functional unit pair will perform the same operation (or substantially the same operation as part of a tightly coupled operation, or a combination of tightly coupled operations as specified by a single instruction) on incoming data.

Scalar and vector operations are distinguished by the manner in which associated address information is used, in accordance with the interpretation of the operation. The operation's interpretation may be a direct result of its operation code, that is, different operation codes may be available for different instructions (e.g., "load scalar byte," "load scalar word," "load scalar vector") or may depend on another part of the system, e.g., mode tag bits to interpret a single "load" opcode. Even scalar data spans an address range of bytes (although fewer bytes than a vector) and there are also variations on how load/store may operate.

Unlike other functional units, which are typically assigned to a specific slot within the SVRF 310, the LSU 306 operates on the entire line of data, or a subset thereof, contained within SVRF 310. The LSU 306 operates in either load or store operation mode, depending on the instruction issued by the issue/branch unit 304. In load mode, LSU 306 receives address information from the preferred slot of the SVRF 310 using bus 331, and loads data from the specified address. When a load vector instruction is being executed, the load operation loads an entire line of data from memory to SVRF 310 using bus 308. When a load scalar operation is specified, the load operation will load at least the number of bits corresponding to the size of the scalar type (typically, byte, halfword, word, and so forth). Additional bits may be loaded in accordance with implementation choices, or invalid data, or data initialized to a default value (such as, but not limited to, "0") may be provided for those bits outside the range of the requested data type. In one embodiment, the "load scalar" operation includes an alignment step, wherein a requested scalar value is aligned in the preferred slot before being stored to SVRF 310. In another embodiment, alignment is performed programmatically using a sequence of one or more instructions.

In the store mode of operation, the LSU 306 receives data to be stored from the SVRF 310 by means of bus 332, and address information from the preferred slot of the SVRF 310 using bus 331, and stores data to the specified address.

Figure 3B:
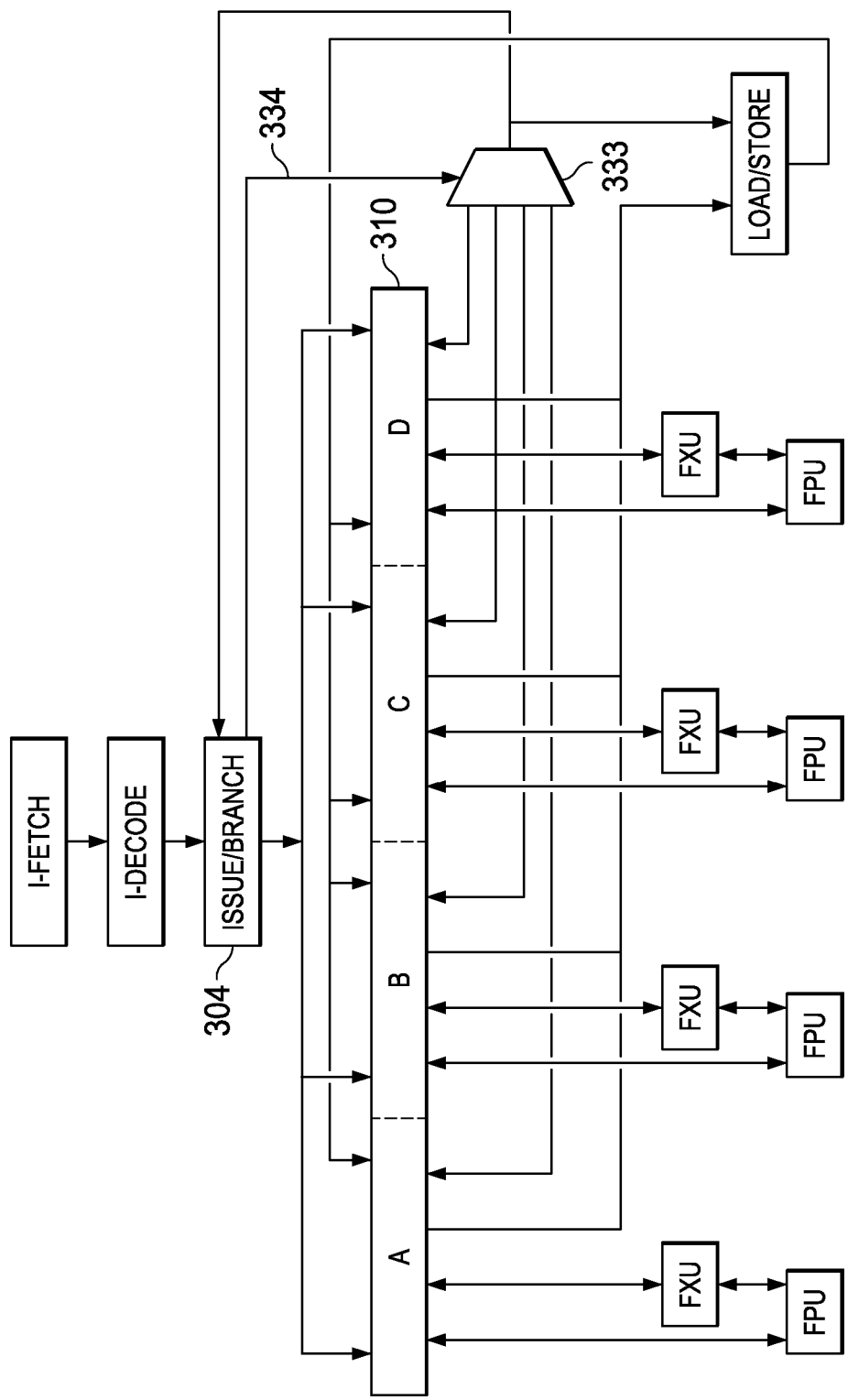
FIG. 3B shows a more flexible, although slightly more complex, approach to selecting scalar data for information as may be used by the branch unit and LSU in accordance with U.S. Pat. No. 6,839,828.

FIG. 3B shows a more flexible, although slightly more complex, approach to selecting scalar data for information as may be used by the branch unit and LSU in accordance with U.S. Pat. No. 6,839,828. In accordance with this embodiment, the various segments of SVRF 310 are selectable by means of a multiplexer 333, which may be controlled with a control input via line 334 from issue/branch unit 304 (which may typically come from a field in the instruction word of the instruction to be executed). Alternate embodiments may include, but are not limited to, a software-controlled special purpose register or a boot-time parameter for supplying the control input of the multiplexer.

The embodiment shown in FIG. 3B operates as follows. When a scalar data value is required by either the load/store unit to supply a memory address for an operation, or by the branch unit to supply, e.g., a branch target address, or a branch condition, or by a shift unit requiring a single shift count to be applied to all elements, or any other unit which may require a scalar data value as its input, the multiplexer 333 is steered by the control input to select one of slots A, B, C, or D as the scalar input for the operation. Thus, in accordance with this embodiment, any of the functional unit pairs can be selected as a "preferred slot", allowing processing operations to be balanced, reduce the need for transfer operations between multiple slots and increase the number of slots in which scalar values can be stored.

Thus, U.S. Pat. No. 6,839,828 describes two different implementations of a preferred slot for scalar processing. The first being a hardwired implementation, wherein the preferred slot is selected at the design phase, and a variable approach, where the preferred slot can be selected on the fly, during execution. As mentioned in the '828 patent, designation of a preferred slot at design time can simplify the implementation in that the above-described selection need not be provided. Moreover, use of identical functional unit pairs may be more efficient, even at the slight overhead cost of having useless circuitry which is never exercised for the preferred slot.

While the register file mechanisms of U.S. Pat. No. 6,839,828, and other known register file mechanisms, allow for a single register file to be used for both scalar and vector operations, the known register file mechanisms do not provide multi-addressability, but only the ability to store different types of instructions/data in a single register file. A complex new architecture and/or operations for handling the different types of instructions/data in the single register file. This precludes the architecture from being able to process legacy programs, as discussed previously above. Moreover, the prior art does not provide multi-addressability, but only the ability to store different types of instructions in the register file.

In contrast, the illustrative embodiments provide an apparatus and method for providing a multi-addressable register file that permits both legacy instructions and a new type of instruction to access the registers of the multi-addressable register file. With the mechanisms of the illustrative embodiments, a single register file may be addressed using both scalar and Single Instruction Multiple Data (SIMD) or vector instructions. That is, subsets of registers within a multi-addressable register file according to the illustrative embodiments, are addressable with different instruction forms, e.g., scalar instructions, SIMD or vector instructions, etc., while the entire set of registers may be addressed with yet another form of instructions, referred to herein as Vector-Scalar Extension (VSX) instructions. The types of operations, i.e. the operation set, that may be performed on the entire set of registers using the VSX instruction form is substantially similar to that of the operation sets of the subsets of registers.

The multi-addressable register file of the illustrative embodiments allows legacy instructions to access subsets of registers within the multi-addressable register file while new instructions, i.e. the VSX instructions, may access the entire range of registers within the multi-addressable register file. Moreover, the data formats of the legacy instructions are compatible with the data format of the new instructions. Thus, data generated by legacy instructions may be processed by the new instructions and vice versa.

For example, the illustrative embodiments allow legacy floating point instructions (scalar operations) to work on values stored in a first subset of registers of a register file, e.g., VSX registers 0-31, legacy VMX instructions (vector operations) to work on a second subset of registers in the register file, e.g., VSX registers 32 to 63 (while continuing to refer to registers 0 to 31 in the actual instructions), and new VSX instructions (vector-scalar operations) to operate on all of the registers of the register file, e.g., VSX registers 0 to 63. The illustrative embodiments further allow instructions of different types to share data using the various subsets of registers and the ability of the new instruction type, i.e. VSX instructions, to access all of the registers of the register file. For example, data may be shared between VSX and legacy floating point instructions by storing and accessing data in VSX registers 0 to 31. Similarly, the illustrative embodiments allow data to be shared between legacy VMX instructions and new VSX instructions in VSX registers 32 and 63, while continuing to execute programs that use either one or both of legacy floating point and legacy VMX instructions without any modification. Moreover, the illustrative embodiments permit linking code modules that use either one or both of legacy floating point and legacy VMX instructions without any modification to code modules that employ the new VSX instructions as well as share data between code modules computing with legacy instructions and those using new instructions.

Figure 4:
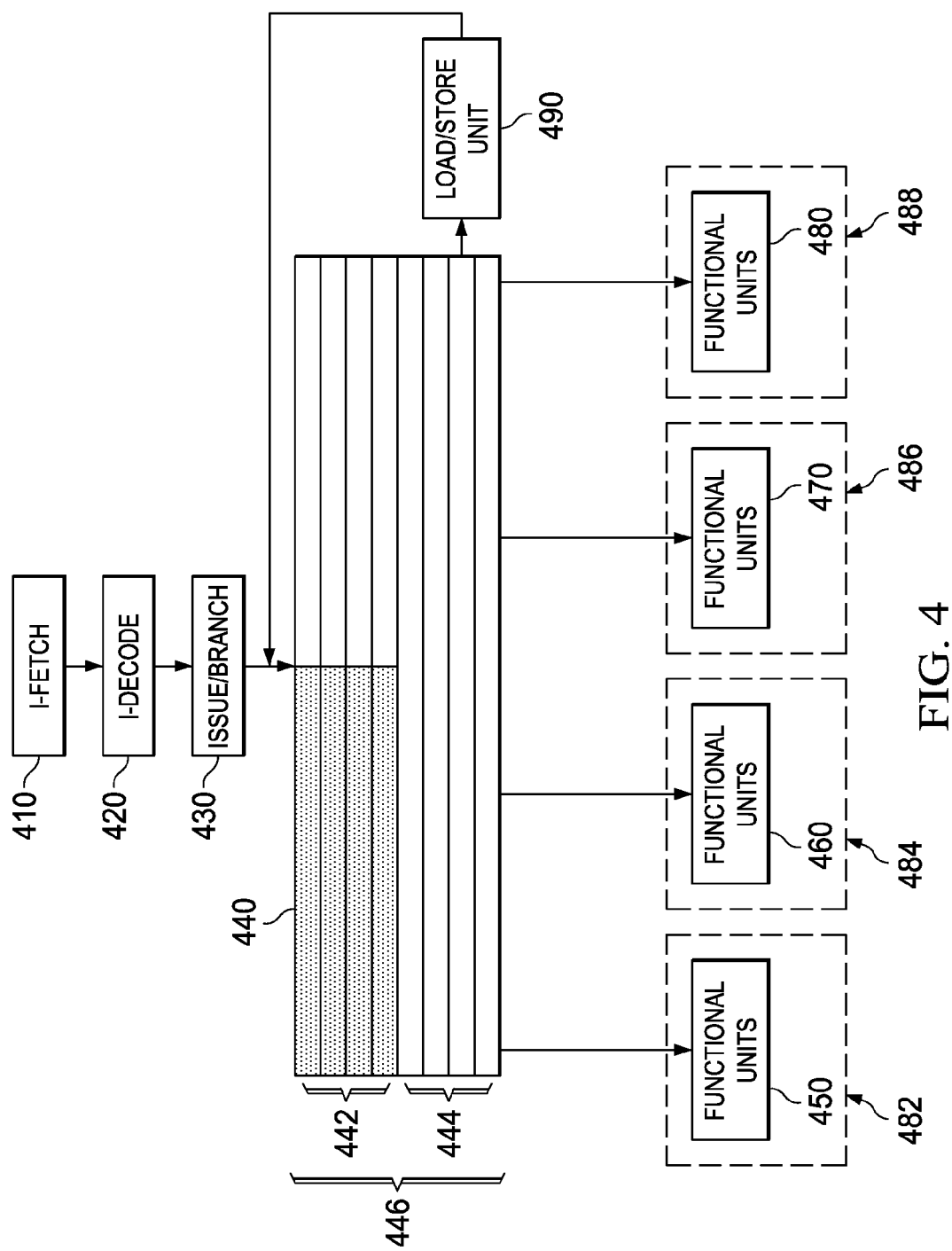
FIG. 4 is an exemplary diagram of a processor in which a multi-addressable register file is utilized in accordance with one illustrative embodiment.

FIG. 4 is an exemplary diagram of a processor in which a multi-addressable register file is utilized in accordance with one illustrative embodiment. As shown in FIG. 4, the processor 400 is similar in configuration to the processor of FIG. 3A with the exception of the configuration and utilization of the register file 440. The instruction fetch unit 410, issue/branch unit 430, functional units 450-480 of the functional unit pairs (or sets) 482-488, and load/store unit 490 all operate in a similar manner as described above with regard to FIG. 3A. The instruction decode unit 420 has additional logic, as described hereafter, that is used to decode instructions of three different types: vector, scalar, and a new vector-scalar instruction type. In one illustrative embodiment, these three different types of instructions are vector multimedia extension (VMX) instructions, floating point (FP) instructions, and new Vector-Scalar Extension (VSX) instructions. FP operations are generally known in the art. VMX instructions are used in the POWER 6 processor, available from International Business Machines Corporation of Armonk, N.Y. and provide single instructions that operate on multiple data elements. VSX instructions will be described in greater detail hereafter.

Based on the decoded instructions, the instruction will access either a sub-range of the register file 440 or the entire range of registers in the register file 440. If the instruction is determined by the instruction decode unit 420 to be a legacy floating point instruction, then a first sub-range 442 of the register file 440 is accessed, with the data being provided to appropriate functional units 450-480 for processing. If the instruction is determined by the instruction decode unit 420 to be a legacy VMX vector instruction, then a second sub-range 444 of the register file 440 is accessed, with the data again being provided to appropriate functional units 450-480 for processing. If the instruction is determined by the instruction decode unit 420 to be a VSX instruction, then a the entire range 446 of the register file 440 may be accessed, with the data being provided to appropriate functional units 450-480 for processing. Depending on the particular VSX instruction being executed, a VSX instruction accessing any of registers 446 can use either the entire width of the register to obtain input data (corresponding to a new VSX vector instruction and providing access to all registers of register file 446 in each of the operand positions of the instruction), or a portion thereof (corresponding to a new VSX scalar instruction and providing access to all registers of register file 446 in each of the operand positions of the instruction, but using only a subset of bits contained therein)

The first sub-range 442 comprises a first range of bits of a first set of registers in the register file 440. The second sub-range 444 comprises a second range of bits of a second set of registers in the register file. The third range 446 comprises an entire range of bits of the entire set of registers in the register file 440. In this way, a single register file 440 may be used to process both legacy scalar and legacy vector instructions as well as a new combined set of vector-scalar instructions, referred to herein as VSX instructions.

VSX instructions are new instructions that can access the entire set of registers of a register file 440. The VSX instruction set consists of several classes of instructions, including single precision scalar floating point instructions accessing a 32-bit subrange of each register of the entire register file 440, double precision scalar floating point instructions accessing a 64-bit subrange of each register of the entire register file 440, and new vector instructions accessing the entire range of bits in the entire register file 440. The VSX instructions use a new type of register specifier, e.g., a 6 bit register specifier as opposed to a legacy 5 bit specifier that is used by legacy scalar and legacy vector instructions.

Thus, the illustrative embodiments provide a single scalar/vector architecture for a register file that is compatible with legacy architectures having separate scalar and vector register files. The illustrative embodiments further allow sharing of the storage space of the processor between legacy register files and a new expanded vector-scalar register file without leading to increased chip area. Moreover, the illustrative embodiments allow data sharing between legacy programs and libraries using legacy instructions, and new programs and libraries (using either legacy or new instructions), as well as interoperation of code, thereby protecting investment in code tuning of legacy applications and avoiding the need to recode all applications to use the new instructions while allowing the new instructions to be used where they are most profitable As a result, the expensive overhead experienced by known processor architectures that utilize separate register files for scalar and vector, e.g., single instruction multiple data (SIMD), instructions, as well as the additional costs involved with complex new architectures for handling both scalar and vector instructions using a single register file, may be avoided.

The register file 440 is comprised of a plurality of vector-scalar registers (VSRs), each VSR having a plurality of bits. For example, the register file 440 may be comprised of 64 VSRs numbered VSR[0] to VSR[63] with each VSR having 128 bits numbered 0 to 127. For representation purposes, it will be assumed that VSRs are numbered consecutively from the top to the bottom of the register file 440 with bits being numbered consecutively from left to right of the register file 440. This is shown in FIG. 5 discussed hereafter.

Figure 5:
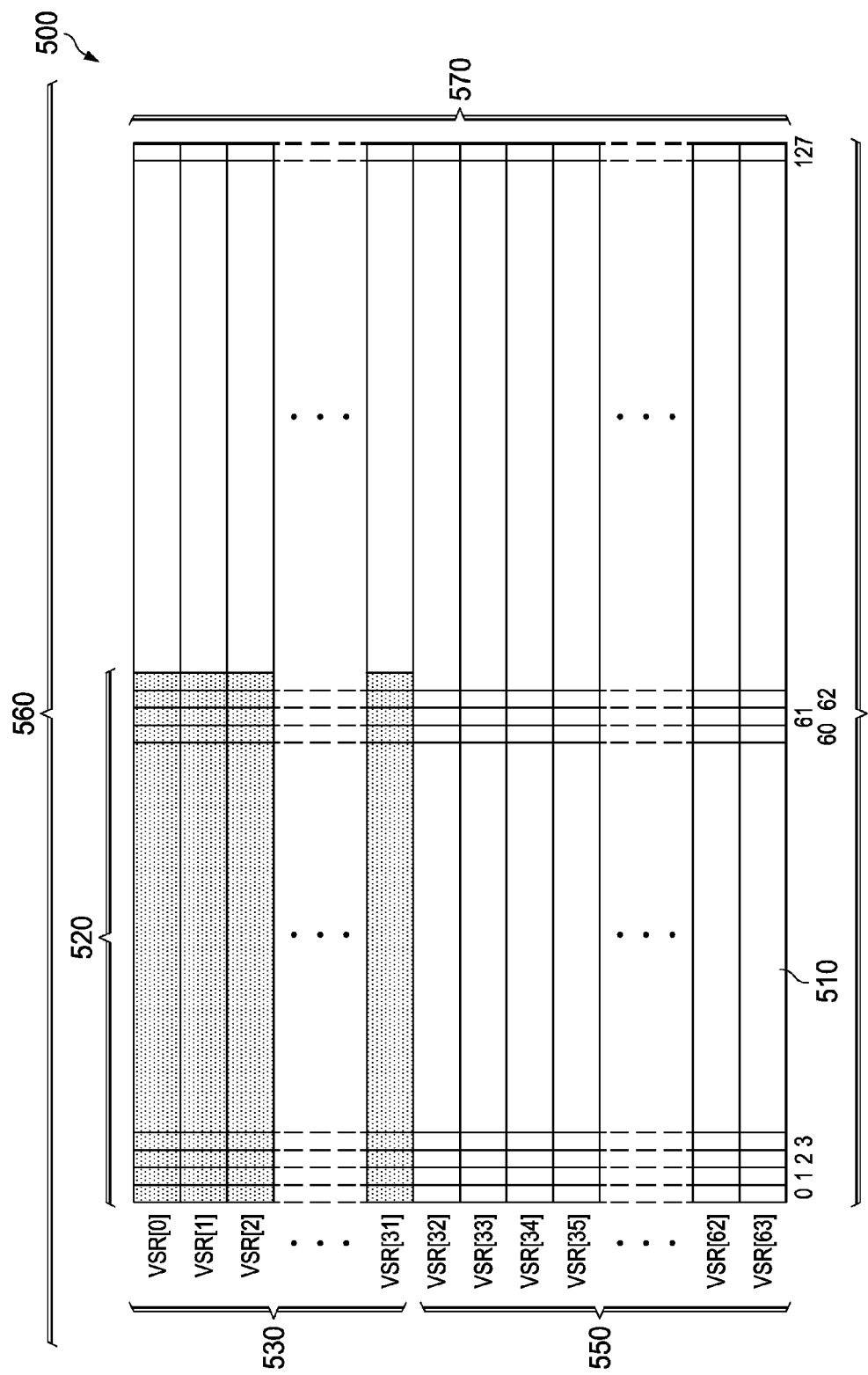
FIG. 5 is an exemplary diagram of a Vector-Scalar Extension (VSX) register file in accordance with one illustrative embodiment.

FIG. 5 is an exemplary diagram of a Vector-ScalarX (VSX) register file in accordance with one illustrative embodiment. The VSX register file 500 of FIG. 5 may be utilized as register file 440, for example. As shown in FIG. 5, the VSX register file 500 includes a plurality of vector-scalar registers (VSRs) 510 numbered VSR[0] to VSR[63]. Each of the VSRs 510 has a predetermined number of bits that may be set. In the depicted example, each VSR 510 has 182 bits numbered 0 to 127 for storing data corresponding to instructions, such as for parameter passing.

A first sub-range of bits 520 in a first set of registers 530 of the register file 500 is associated with a first type of instruction, such as a scalar or floating point instruction. A second sub-range of bits 540 in a second set of registers 550 in the register file 500 is associated with a second type of instruction, such as a vector, SMID, or VMX instruction. A third range of bits 560 in the entire set of registers 570 of the register file 500 is associated with a third type of instruction, such as a VSX instruction.

It can be appreciated from FIG. 5 that the VSX register file 500 differs from known register files in known systems by allowing three different types of instructions to access registers of the VSX register file 500 based on associated register ranges and bit widths within the registers. Known register files, upon which the mechanisms of the illustrative embodiments improve, require that the entire register file be accessed in the same manner for all types of instructions by specifying the register to be accessed with respect to the entire set of registers 570 rather than with respect to a subset of registers that corresponds to all operands of a specific instruction type.

With the VSX register file 500, when a legacy scalar operation is to read/write data from/to the VSX register file 500, in one illustrative embodiment, the scalar data value is read/written from/to the left side of the register width, i.e. bits 0 to 63 of registers VSR[0] to VSR[31], for example first subrange 520. There are a number of ways writing of scalar values to the vector-scalar registers (VSRs) may be accomplished with the illustrative embodiments. In one illustrative embodiment, all of the bits of the VSR may be written with the scalar value being written to bits 0 to 63 while values corresponding to the result of a vector computation being performed for the bits not corresponding to the scalar data value, on the registers specified by the scalar instruction, are written to the bits 64 to 127. For example, if the data values of registers F0 and F1 are added to give a result in register F3, the value of VSR3 in bits 64 to 127 might correspond as if a vector operation had been performed on the bits 64 to 127 of VSR0 and VSR1.

In another illustrative embodiment, the scalar value that is to be written to bits 0 to 63 may be replicated in bits 64 to 127. This approach may be beneficial, for example, when a scalar floating point value should later be combined with a vector value, e.g., when multiplying a vector by a scalar value. Normally the scalar value has to first be replicated across an entire register, such as with a "splat" instruction of the VMX or VSX instruction sets. This approach would eliminate the need for performing a "splat" instruction since the scalar value is already replicated.

In still another illustrative embodiment, the scalar value may be written to bits 0 to 63 of the register while whatever values that were present in bits 64 to 127 may remain unchanged. Such an approach may be used when a vector operation may need to be decomposed into a sequence of scalar operations, where each scalar result could be inserted into a specific vector element, ultimately creating a vector result from the multiple scalar results. This would be the lowest power embodiment since, when nothing needs to be written to the registers, nothing is written. However, it may lead to indeterminism, because the value present in the entire register may now be dependent on what value was resident in the register file prior to a scalar result being written. This is particularly problematic for architectures with register renaming, where the value present in the rename register is highly unpredictable.

In another illustrative embodiment, the scalar value may be written to bits 0 to 63 of the register while the remaining bits 64 to 127 may be filled with a default value, e.g., a zero. Such an approach may be used when a vector operation may need to be decomposed into a sequence of scalar operations, where the multiple scalar results are shifting and ORed together to form a vector result. This approach gives a predictable value, thus avoiding the problems associated with not writing anything. This option further represents lower load on the result bus than replicating the value (because that value does not have to be provided to 2 locations in the register which double the load).

For legacy vector, SIMD, or VMX instructions, the data values are read from/written to the entire range of bits 0 to 127 of the second set of VSRs [32] to [63]. For the new VSX instructions, data values are read from/written to the entire range of bits 0 to 127 of the entire set of VSRs [0] to [63]. With these VSX instructions, scalar values are written in the left side bits 0 to 63 of the registers while vector values are written across all of the bits 0 to 127.

Thus, with the mechanisms of the illustrative embodiments, when decoding instructions, there are really two characteristics of the instructions that need to be decoded. First is the width of the data access, i.e. the access width specification, and second is the register specifier. The access width specification identifies which bits of a register are to be read/written. The register specifier identifies which subset of registers, or the entire set of registers, in the multi-addressable register file that are to be read/written. The primary requirement for decoding the instruction is the register specifier which allows the multi-addressability aspect of overlaying the legacy smaller register files on top of the new vector-scalar register file to allow storage sharing.

Referring again to FIG. 4, as discussed above, decoding logic is added to an instruction decode unit 420 of a processor 400 for handling the three types of instructions using the single register file of the illustrative embodiments. The decoding logic determines the type of instruction and, based on the type of instruction, generates a width specifier for specifying the bit width of the registers in the register file 440 that may be accessed by the instruction. A full specifier for the entire register width is then generated based on the type of instruction and the width specifier and registers within a corresponding subset of registers 442-446 in the register file 440 are then addressed using the full specifier. Results of the operation are then computed based on the addressing of the subset of registers 442-446 using the full specifier with results of the operation being written back to the subset of registers 442-446 in the register file 440.

In accordance with one illustrative embodiment, there is provided an implementation of the Power Architecture (also known under the names of "PowerPC™" and "Power ISA™") including at least a first set of instructions of "Category: Floating-Point" (FPU, or legacy FPU), a second set of instructions of "Category: Vector" (VMX), and third set of instructions of "Category: VSX" in accordance with specifications set forth in Appendices to this Detailed Description of the Preferred Embodiments, which are hereby incorporated into this text by reference. Detailed information regarding floating point processor facilities is provided in Appendix A. Detailed information regarding a VMX processor facility is provided in Appendix C. Detailed information regarding a VSX processor facility is provided in Appendix D. In accordance with one illustrative embodiment, additional sets of instructions, such as of "Category: Decimal Floating-Point", may be present as detailed in Appendix B. Thus, for detailed information regarding each of these facilities, reference should be made to these appendices which are to be read in conjunction with the present Detailed Description of the Preferred Embodiments.

In accordance with one illustrative embodiment implementing the Power Architecture, the architected data format corresponding to instructions of "Category: Floating-Point" (FPU) (Appendix A) is IEEE 754 double precision floating point format as provided in the Power Architecture memory format, i.e., single precision load instructions convert single precision memory data to double precision representation, single precision store instruction convert floating point values to single precision format. Results generated with single precision instructions can serve as input directly to double precision instructions. Architecturally, the "Category: Floating-Point" instructions have been optimized for mixed precision computation and storage with respect to single and double precision floating point formats in the floating point register file. To optimize computations, and the conversion of single precision values into the double precision format, at least one implementation uses an internal format, e.g., having a representation of single precision denormalized numbers with an internally non-normalized format to avoid the cost of normalization during the loading and data conversion of a single precision floating point value, and potentially for other operations. However, this is hidden and not architecturally visible to any of the "Category: Floating-Point" instructions.

In accordance with one illustrative embodiment implementing the Power Architecture, the architected data format corresponding to instructions of "Category: VMX" (VMX) (Appendix C) is a memory image of data words having been read, and corresponding either to a vector of bytes, halfwords (2 bytes), words (4 bytes), or single precision floating point in accordance with IEEE single precision data layout. Memory access instructions do not provide any conversion between the memory format (with the possible exception of endian adjustment). This format is optimized for mixed integer/single precision floating point computation as often found in graphics computations, which represent one of the optimization targets of the VMX instruction category.

In accordance with one illustrative embodiment implementing the Power Architecture, the architected format of instructions of "Category: VSX" (VSX) (Appendix D) is a memory image of data words having been read, and adjusted to the data width of values to represent single elements in the leftmost bits, and entire vectors across the entire set of vector registers. In accordance with the definition of the VSX set of instructions, the architected data format corresponding to the set of VSX instructions is a word (4 bytes), a doubleword (8 bytes), or vectors thereof (16 byte, corresponding to vectors of 4 and 2 elements, of words and doublewords, respectively). The set of "Category: VSX" instructions is optimized for an increased register set, interoperability with the architected data formats of "Category: Floating-Point" and "Category: Vector" instructions, and consists of scalar and vector instructions for floating point and integer data types.

In at least one implementation, the "Category: Floating-Point" instructions are implemented to directly, without renormalizing data conversion, read both internal format generated by "Category: Floating-Point" instructions and memory format generated by "Category: VSX" instructions. In such an implementation, the "Category: Vector" instructions may be implemented to directly read either memory format or internal format generated by "Category: Floating-Point" instructions and memory format generated by "Category: VSX" instructions. In such an implementation, the double precision floating point instructions of "Category: VSX" instructions may be implemented to interoperate with "Category: Floating-Point" and directly, without renormalizing data conversion, read both internal format generated by "Category: Floating-Point" instructions and memory format generated by "Category: VSX" instructions. Integer and single precision instructions of "Category: VSX" instructions may be implemented to interoperate with "Category: Floating-Point" instructions by forcing renormalization when a number, in internal format, does not directly corresponding to a memory format (e.g., when the internal format contains a denormalized number for a value not in the double precision subnormal range).

In accordance with one illustrative embodiment, a register file includes an implicit bit for the leftmost double word in a register, and sets the implicit bit to correspond to the implicit bit of a double precision floating point value corresponding to the bit pattern loaded in said double word, regardless of data usage, when data in memory format is processed. In accordance with this illustrative embodiment, all instructions loading a value to a register set the implicit bit either to a value corresponding to an implicit bit of a floating point number in internal format, or to reflect "0" when the 11 bits 62 to 52 are zero, and "1" when these bits are non-zero.

In accordance with one illustrative embodiment, instructions of "Category: Vector" are not equipped to process numbers in internal format. In accordance with a multi-addressable register file, no data value generated by "Category: Floating-Point" instructions can be directly accessed by "Category: Vector" instructions. In accordance with this illustrative embodiment, any "Category: VSX" instruction that can make a data value generated by "Category: Floating-Point" instruction available as an input to "Category: VMX" instructions must renormalize data to correspond to memory format, when the internal format contains a denormalized number for a value not in the double precision subnormal range.

In accordance with another illustrative embodiment, instructions of "Category: Vector" are equipped to process numbers in internal format. While in accordance with a multi-addressable register file, no data value generated by "Category: Floating-Point" instructions can be directly accessed by "Category: Vector" instructions, in accordance with this embodiment, at least one VSX instruction can copy a number not directly corresponding to memory format without renormalization to a register directly accessible as input operand by an instruction of "Category: Vector", even when the internal format contains a denormalized number for a value not in the double precision subnormal range.

Figure 6:
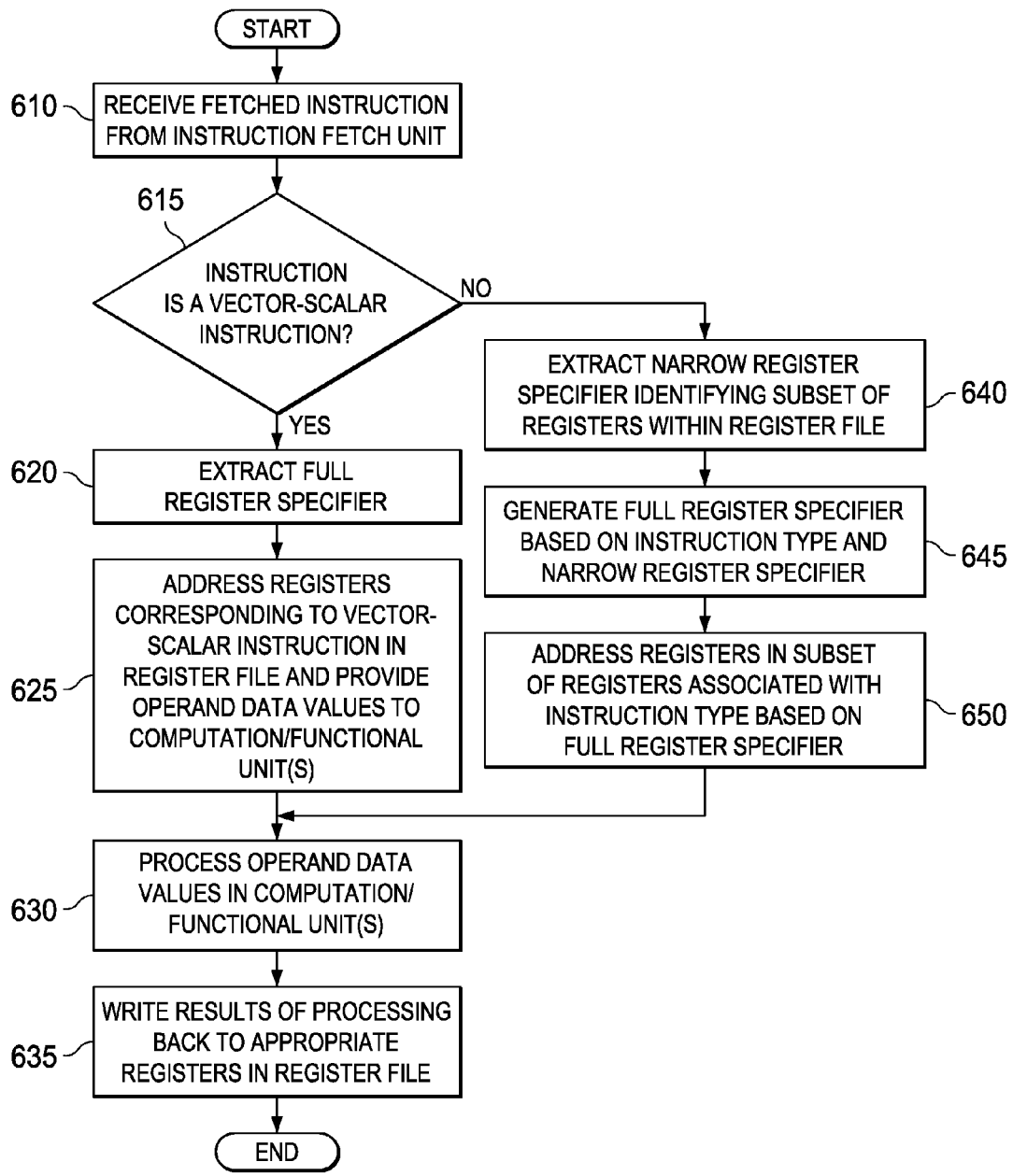
FIG. 6 is a flowchart outlining a general decode operation in accordance with one illustrative embodiment.
Figure 7A:
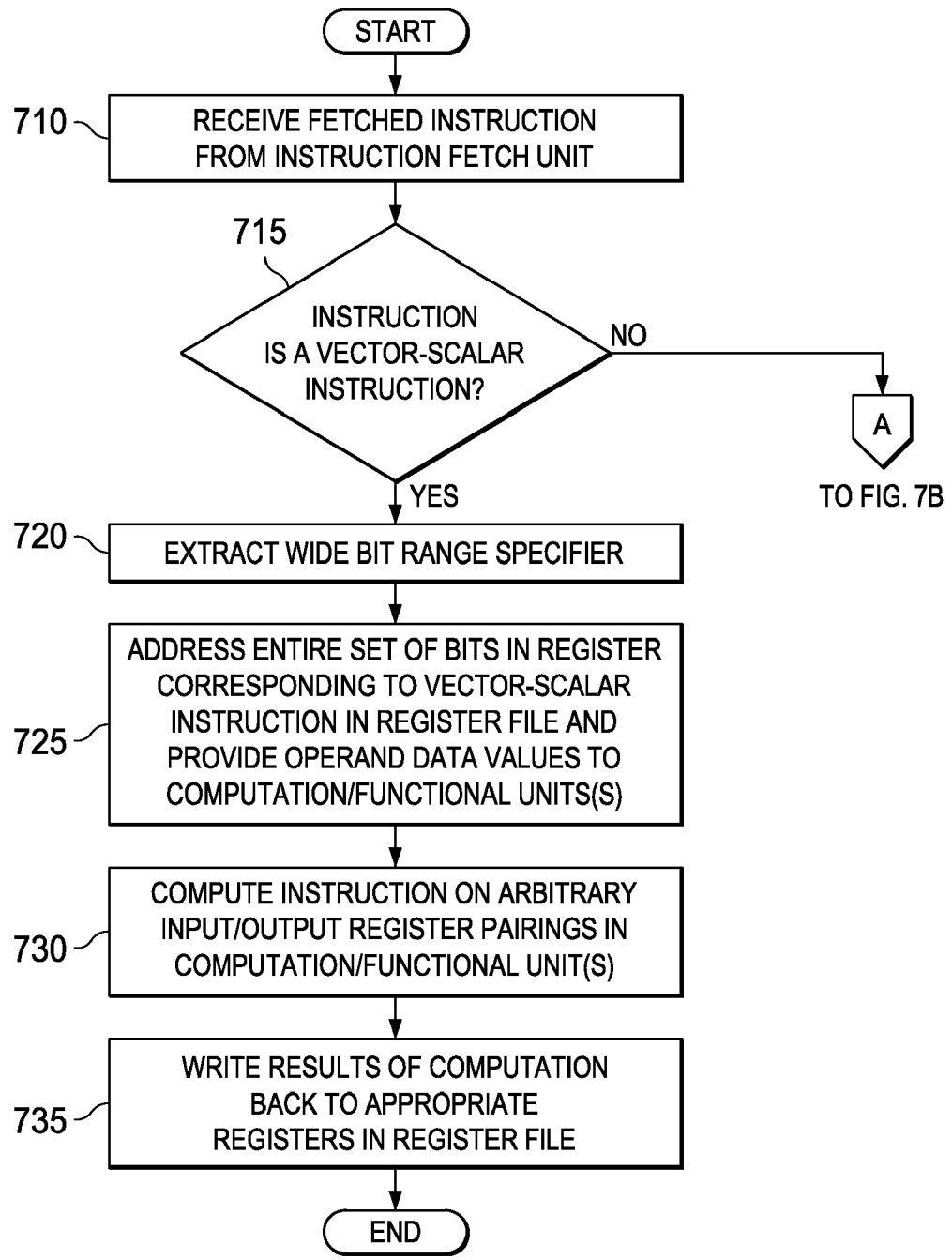
FIGS. 7A and 7B provide a flowchart outlining a first exemplary decode operation in accordance with one illustrative embodiment.
Figure 7B:
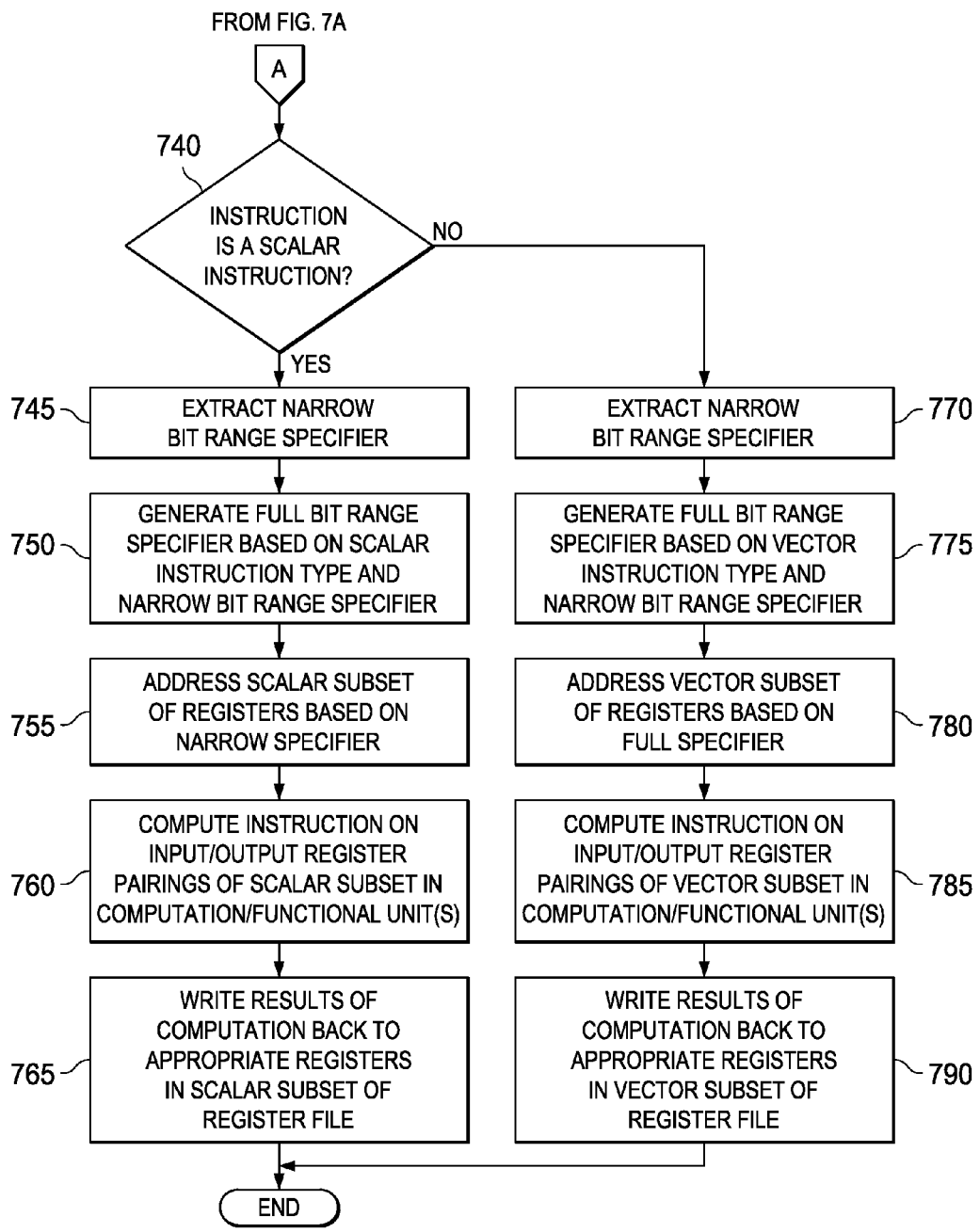

FIGS. 6-7B are flowcharts outlining exemplary decoding operations that may be implemented in the decode logic of the instruction decode unit of the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 6 is a flowchart outlining a general decode operation in accordance with one illustrative embodiment. As shown in FIG. 6, the operation starts with receiving a fetched instruction from an instruction fetch unit (step 610). Based on an opcode of the fetched instruction, the decode logic determines if the fetched instruction is a new type of instruction, e.g., a VSX instruction (step 615). If the opcode identifies the instruction to be a new type (e.g., VSX) instruction, a full register specifier is extracted from one or more fields in the instruction encoding (step 620). Instructions are specified by instruction words having several fields. These fields may include an opcode field, several register specifier fields, and a secondary opcode field, for example. When an instruction is encountered, the instruction decoder may determine what type of instruction is encountered (this is done by analyzing the opcode and secondary opcode field) which will also typically indicate what bits of a register to use (i.e., the subrange 520, 540, 560 to use.) The register specifier fields specify which register of 530, 550, or 570 to access. In one exemplary embodiment, each of the register specifier fields may provide a 5 bit specifier, i.e. a narrow specifier. Extension fields may be provided in the instruction word to provide an additional bit giving 6 bits to specify one of the 64 VSR registers of the register file.

Corresponding registers in the register file are addressed, i.e. selected, so as to provide their data values to appropriate computation or functional units for processing (step 625). That is, the full register specifier is provided to the register file, such that the register file knows which of the registers 570 to read or write. The register specifier is an "address" in a storage array that identifies a register.

The operand data values are processed by the computation/functional units (step 630) and results of the processing by the computation or functional units are then written back to the corresponding registers in the register file (step 635). The specific register to write back to is again specified by a register specifier.

If the opcode of the fetched instruction indicates that the instruction is not a VSX instruction (step 615), then a narrow register specifier is extracted that identifies a subset of registers, and possibly bits within the full width of a register, for use with the instruction (step 640). A full register specifier for the entire range of bits of the register is then generated based on the instruction type and the narrow bit range specifier (step 645). That is, one or more bits are added to the narrow register specifier to generate the full register specifier. The bits to be added depend on the subranges of the register file and how they were defined. For example, for legacy scalar instructions a 5-bit operand specifier, i.e. a narrow bit range specifier, is provided for each operand in the instruction encoding. A full register specifier may be generated, for example, by prepending a 0 to produce a 6-bit specifier, giving access to VSRs 0-31 in the depicted examples. For legacy scalar instructions, a 5-bit operand specifier, i.e. a narrow register specifier, is provided for each operand in the instruction encoding. A full register specifier may be generated, for example, by prepending a 1 to produce a 6-bit specifier, giving access to VSRs 32-63. For VSX instructions, a 6-bit operand specifier, i.e. a full bit range specifier, is provided for each operand in the instruction encoding and thus, no modification is needed to access all of the VSRs in the register file.

The narrow and full register specifiers of the illustrative embodiments allow for the "multi-addressable" nature of the register file which refers to the fact that different instructions in effect contain different addresses, and that the decoding adapts them, to overlay and use shared addressing of the register file. Thus, for example, a VSX register full register specifier with the 6 bits 000000 refers to VSX register 0. A legacy floating point instruction with a narrow register specifier of 5 bits 00000 refers to the same register, because it overlays the first 32 registers of VSR registers and is obtained by adding a "0" to the 5 bit narrow register specifer, giving 000000 in this specific example. On the other hand, a legacy VMX narrow register specifier of 5 bits 00000 refers to register 32 (the first register in the VSR32 to 63 range), and is obtained by adding a "1" to the 5 bit specifer, giving 100000 in the specific example.

Once the full register specifier is obtained, registers in a subset of registers associated with the instruction type identified by the opcode are addressed based on the full register specifier (step 650). A bit width may optionally be determined based on the instruction type such that a first set of bits of the register are associated with one instruction type, e.g., legacy scalar instructions, and another set of bits of the register are associated with another instruction type, e.g., legacy vector instructions. This functionality was described above and is optional to the particular implementation. Because it is optional, it is not explicitly shown in FIG. 6.

The operation then continues to step 630 where data values, e.g., operand values, from the addressed registers are provided to the computation/functional units for processing (step 630) and results are written back to the registers in the subset of registers (step 635) using the full register specifier. The operation then terminates.

FIGS. 7A and 7B depict a flowchart outlining a exemplary decode operation for one exemplary implementation in accordance with one illustrative embodiment. As shown in FIGS. 7A and 7B, the operation again starts with receiving a fetched instruction from an instruction fetch unit (step 710). Based on an opcode of the fetched instruction, the decode logic determines if the fetched instruction is a new type of instruction, e.g., a VSX instruction (step 715). If the opcode identifies the instruction to be a new type (e.g., VSX) instruction, a wide bit range specifier is extracted (step 720). A wide bit range specifier can address any of the registers 570, i.e., the full register file is addressed, as well as all bits in those registers (step 725). The corresponding register may be any register in the entire register file. The instruction is then computed using the data from the register with the computation being on arbitrary input and output register pairings (step 730). In other words, the VSX instructions operate on any of the registers in the register file and are not limited to a particular sub-range of registers. The results of the computation are then written back to an appropriate register in the register file (step 735).

If the opcode of the instruction indicates that the instruction is not a VSX instruction (step 715), then the decode logic determines if the instruction opcode identifies the instruction to be a scalar instruction, e.g., a floating point instruction or the like (step 740). If the instruction opcode identifies the instruction as a scalar instruction, then a narrow bit range specifier is extracted that identifies a subset of registers within the register file and optionally, a subset of bits within the registers of the subset of registers (step 745). A full bit range specifier is generated based on the instruction type and the narrow bit range specifier (step 750). Data is extracted from a subset of registers, e.g., the scalar subset of registers, associated with the instruction type specified by the opcode using the narrow bit range specifier (step 755). The data is provided to the computation/functional units which compute results based on input and output registers corresponding to the scalar subset of registers in the register file (step 760). The results of the computation are then written back to an appropriate register in the subset of registers for this instruction type, e.g., scalar register subset (step 765).

If the opcode of the instruction indicates that the instruction is not a scalar instruction (step 715), then a narrow bit range specifier is extracted that again identifies a subset of registers in the register file and optionally another subset of bits within these registers (step 770). A full bit range specifier is generated based on the instruction type, e.g., vector, SIMD, or VMX instruction, and the narrow bit range specifier (step 775). Data is extracted from a subset of registers, e.g., the vector subset of registers, associated with the instruction type specified by the opcode using the full bit range specifier (step 780). The data is provided to the computation/functional units which compute results based on input and output registers corresponding to the vector subset of registers in the register file (step 785). The results of the computation are then written back to an appropriate register in the subset of registers for this instruction type, e.g., vector register subset (step 790). The operation then terminates.

It can be seen from the above description that the illustrative embodiments provide a register file and decode methodology that permits three different types of addressing modes. In a first addressing mode, a non-contiguous encoding is used to select all operand registers from a full set of registers in the register file based on a first instruction type, e.g., VSX instruction type. In a second addressing mode, a contiguous encoding is used and a first range of addressable operand registers of the full set of registers in the register file is selected based on a second instruction type, e.g., a scalar instruction type. A register address is constructed for each of the operands such that all of the operands for the instruction are obtained from the first range of addressable operand registers.

In a third addressing mode, a contiguous encoding is also used and a second range of addressable operand registers is selected from the full set of registers in the register file based on a third instruction type, e.g., a vector instruction type. A register address is constructed for each of the operands such that the operands for the instruction are obtained from the second range of addressable operand registers. This second range of operand registers is preferably different from the first range of operand registers such that a register within the first range is not within the second range of operand registers.

The illustrative embodiments improve upon known systems and processor register file architectures and instruction decode methodologies by allowing a single register file to be used in processing legacy scalar, legacy vector, and new vector-scalar instructions. In this way, legacy scalar and vector instructions may be processed in addition to new vector-scalar instructions with data formats being compatible between the various instruction types. Moreover, since a single register file is being utilized, the overhead associated with switching between separate register files is avoided. Register sharing in accordance with the illustrative embodiments reduces the chip area of a register file and allows a unified register file to be utilized while maintaining legacy code without building separate legacy register files. The illustrative embodiments allow for data sharing between legacy and new instructions, i.e., a legacy instruction may write one of registers 530 or 550, and a new instruction, e.g., a VSX instruction, can combine values from any or all of registers 570.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for processing an instruction, comprising:
    determining an instruction type for a received instruction;
    accessing a multi-addressable register file based on the instruction type; and
    processing the instruction using a function unit of the data processing system based on results of accessing the multi-addressable register file, wherein the multi-addressable register file comprises a first subset of registers associated with first instructions of a first instruction type and a second subset of registers associated with second instructions of a second instruction type, and wherein third instructions of a third instruction type access registers in an entire set of registers of the multi-addressable register file including registers in the first subset of registers and registers in the second subset of registers, wherein the first instruction type is a legacy scalar instruction type, the second instruction type is a legacy floating point instruction type, and the third instruction type is a vector-scalar instruction type.

2. The method of claim 1, wherein accessing a multi-addressable register file based on the instruction type comprises:
    identifying a portion of a register file associated with the instruction type of the received instruction; and
    accessing a register in the portion of the register file to obtain data for processing the instruction.

3. The method of claim 2, further comprising:
    writing results of the processing of the instruction to the portion of the register file.

4. The method of claim 1, wherein the first subset of registers and second subset of registers are non-overlapping.

5. The method of claim 1, wherein accessing the multi-addressable register file based on the instruction type further comprises:
    extracting a register specifier associated with the received instruction, wherein the register specifier identifies a register within one of the first subset of registers, the second subset of registers, or the entire set of registers of the register file based on the instruction type.

6. The method of claim 5, wherein the register specifier has a narrow register specifier format for the first and second instruction types and has a full register specifier format for the third instruction type.

7. The method of claim 6, wherein accessing the multi-addressable register file based on the instruction type further comprises:
    generating a full register specifier from the extracted register specifier if the extracted register specifier has a narrow register specifier format.

8. The method of claim 7, wherein generating the full register specifier from the extracted register specifier comprises adding one or more bits to the extracted register specifier based on the instruction type of the received instruction.

9. The method of claim 8, wherein a first set of one or more bits are added to the extracted register specifier if the instruction type of the received instruction is the first instruction type, a second set of one or more bits, different from the first set of one or more bits, are added to the extracted register specifier if the instruction type of the received instruction is the second instruction type.

10. An apparatus, comprising:
    an instruction decode unit coupled to the instruction fetch unit;
    a multi-addressable register file coupled to the instruction decode unit; and
    one or more functional units coupled to the multi-addressable register file, wherein:
    the decode unit determines an instruction type for a received instruction and accesses the multi-addressable register file based on the instruction type,
    the one or more functional units process the instruction based on results of accessing the multi-addressable register file,
    the multi-addressable register file comprises a first subset of registers associated with first instructions of a first instruction type and a second subset of registers associated with second instructions of a second instruction type, and
    third instructions of a third instruction type access registers in an entire set of registers of the multi-addressable register file including registers in the first subset of registers and registers in the second subset of registers, wherein the first instruction type is a legacy scalar instruction type, the second instruction type is a legacy floating point instruction type, and the third instruction type is a vector-scalar instruction type.

11. The apparatus of claim 10, wherein the decode unit accesses a multi-addressable register file based on the instruction type by:
    identifying a portion of a register file associated with the instruction type of the received instruction; and
    accessing a register in the portion of the register file to obtain data for processing the instruction.

12. The apparatus of claim 11, wherein the one or more functional units write results of the processing of the instruction to the portion of the register file.

13. The apparatus of claim 10, wherein the first subset of registers and second subset of registers are non-overlapping.

14. The apparatus of claim 10, wherein the decode unit accesses the multi-addressable register file based on the instruction type by:
    extracting a register specifier associated with the received instruction, wherein the register specifier identifies a register within one of the first subset of registers, the second subset of registers, or the entire set of registers of the register file based on the instruction type.

15. The apparatus of claim 14, wherein the register specifier has a narrow register specifier format for the first and second instruction types and has a full register specifier format for the third instruction type.

16. The apparatus of claim 15, wherein the decode unit accesses the multi-addressable register file based on the instruction type by:
    generating a full register specifier from the extracted register specifier if the extracted register specifier has a narrow register specifier format.

17. The apparatus of claim 16, wherein generating the full register specifier from the extracted register specifier comprises adding one or more bits to the extracted register specifier based on the instruction type of the received instruction.

18. The apparatus of claim 17, wherein a first set of one or more bits are added to the extracted register specifier if the instruction type of the received instruction is the first instruction type, a second set of one or more bits, different from the first set of one or more bits, are added to the extracted register specifier if the instruction type of the received instruction is the second instruction type.

19. A computer program product comprising a computer readable storage medium having a computer readable program stored thereon, wherein the computer readable program, when executed on a computing device, causes the computing device to:

determine an instruction type for a received instruction;

access a multi-addressable register file based on the instruction type; and process the instruction using a function unit of the data processing system based on results of accessing the multi-addressable register file, wherein the multi-addressable register file comprises a first subset of registers associated with first instructions of a first instruction type and a second subset of registers associated with second instructions of a second instruction type, and wherein third instructions of a third instruction type access registers in an entire set of registers of the multi-addressable register file including registers in the first subset of registers and registers in the second subset of registers, wherein the first instruction type is a legacy scalar instruction type, the second instruction type is a legacy floating point instruction type, and the third instruction type is a vector-scalar instruction type.

\* \* \* \* \*